United States Patent
Wynne et al.

(10) Patent No.: US 6,738,757 B1
(45) Date of Patent: May 18, 2004

(54) SYSTEM FOR DATABASE MONITORING AND AGENT IMPLEMENTATION

(75) Inventors: Thomas David Wynne, Lynnwood, WA (US); Clifford John Monlux, Seattle, WA (US)

(73) Assignee: Workwise, Inc., Bellevue, WA (US)

( * ) Notice: Subject to any disclaimer, the term of this patent is extended or adjusted under 35 U.S.C. 154(b) by 0 days.

(21) Appl. No.: 09/416,460

(22) Filed: Oct. 12, 1999

Related U.S. Application Data

(60) Provisional application No. 60/137,091, filed on Jun. 2, 1999.

(51) Int. Cl.$^7$ .............................................. G06F 17/30
(52) U.S. Cl. .............................. 707/3; 707/6; 707/201; 707/204
(58) Field of Search ................................ 707/3, 201, 204

(56) References Cited

U.S. PATENT DOCUMENTS

| | | | |
|---|---|---|---|
| 5,216,603 A | | 6/1993 | Flores et al. ............. 704/1 |
| 5,287,496 A | * | 2/1994 | Chen et al. ............. 707/3 |
| 5,338,255 A | | 8/1994 | Akehurst ............. 707/4 |
| 5,369,757 A | * | 11/1994 | Spiro et al. ............. 714/19 |
| 5,530,939 A | * | 6/1996 | Mansfield et al. ......... 707/201 |
| 5,561,793 A | | 10/1996 | Bennett et al. ........... 707/201 |
| 5,666,526 A | | 9/1997 | Reiter et al. ............. 707/2 |
| 5,701,480 A | * | 12/1997 | Raz .................. 714/19 |
| 5,734,837 A | | 3/1998 | Flores et al. ............. 705/7 |
| 5,765,028 A | * | 6/1998 | Gladden .............. 707/10 |
| 5,926,819 A | * | 7/1999 | Doo et al. ............. 707/104.1 |
| 5,991,758 A | * | 11/1999 | Ellard .................. 707/6 |
| 5,999,943 A | * | 12/1999 | Nori et al. ............. 707/104.1 |
| 6,085,197 A | * | 7/2000 | Federighi et al. .......... 707/204 |
| 6,112,197 A | * | 8/2000 | Chatterjee et al. ......... 707/201 |
| 6,125,390 A | * | 9/2000 | Touboul ............... 709/223 |
| 6,151,602 A | * | 11/2000 | Hejlsberg et al. .......... 707/101 |
| 6,167,535 A | * | 12/2000 | Foote et al. ............. 714/38 |
| 6,237,001 B1 | * | 5/2001 | Bamford et al. ........... 707/3 |
| 6,243,718 B1 | * | 6/2001 | Klein et al. ............. 707/203 |
| 6,341,287 B1 | * | 1/2002 | Sziklai et al. ............. 707/102 |
| 6,434,681 B1 | * | 8/2002 | Armangau .............. 711/162 |

* cited by examiner

Primary Examiner—Kim Vu
Assistant Examiner—Anh Ly

(57) ABSTRACT

Comprising an engine and intelligent agents, the invented system monitors a data network for important events selected by the user and upon detection puts the information into action. Examples of actions that can be initiated include: updating ODBC compliant databases, sending E-mail (with file attachments) to a customer, partner or employee, merging data with and printing RTF documents, invoking VBScript or Jscript, running a program, executing SQL statements or stored procedures. The invented system incorporates a data monitor, process scheduler, and an event logging system. It establishes a snapshot of a data network, without replication, and compares this snapshot with the data viewed subsequently to determine if any data in the table being monitored has been changed, deleted, or added. Using an interface that guides users through the database selection process and that guides the user through the data server agent process, the query builder writes standard SQL statements to access and take action on data adds, changes and deletes.

12 Claims, 4 Drawing Sheets

SYSTEM FOR DATABASE MONITORING AND AGENT IMPLEMENTATION

This application is entitled to the benefit of Provisional Application Ser. No. 60/137,091, filed Jun. 2, 1999.

BACKGROUND—FIELD

This invention is in the field of client-server computer systems and the use of business rules to trigger informational events and update events as a result of the application of those rules.

BACKGROUND—PRIOR ART

The field of client server computing has grown tremendously in the past few years. In an enterprise environment many separate computer systems may contain many different electronic databases. These islands of data can cause a serious communication problem when a database changes. These changes may require that one or more people are informed, or a different database be corrected to reflect the new information. The present software tools available to the average user are very complicated to use. In many cases extensive programming experience may be required to do something as simple as linking two disparate databases together so that when one changes the other reflects that change. This invention simplifies the process of communicating when a database changes. The preferred embodiment of this invention also allows business rules to be applied to the database change. Both the type of information sent and even where that information may go can be determined by comparing the data that changed to a predetermined parameter. The outcome of that comparison then can determine the business rule that is to be applied to the changed data.

DETAILED DESCRIPTION OF THE INVENTION

Figure 1:
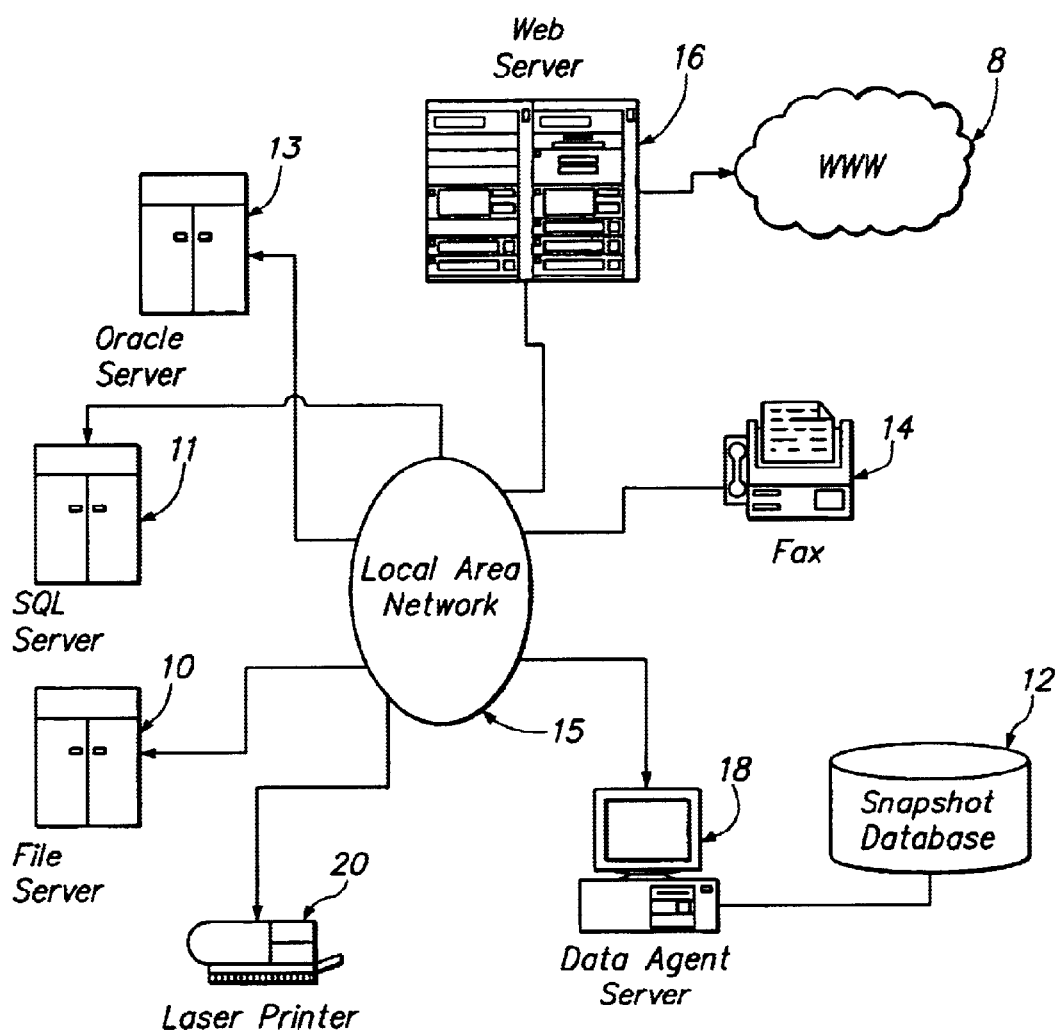
FIG. 1 is a pictorial representation of how the invented system is integrated into a network along with peripheral devices.

Comprising an engine and intelligent agents, the invented system monitors a data network for important events selected by the user and upon detection puts the information into action. Examples of actions that can be initiated include: updating ODBC compliant databases, sending E-mail (with file attachments) to a customer, partner or employee, merging data with and printing RTF documents, invoking VBScript or Jscript, running a program, executing SQL statements or stored procedures. The invented system incorporates a data monitor, process scheduler, and an event logging system. It establishes a snapshot of your data network, without replication, and compares this snapshot with the data viewed subsequently to determine if any data in the table being monitored has been changed, deleted, or added. Using an interface that guides users through the database selection process and that guides the user through the data server agent process the query builder writes standard SQL statements to access and take action on data adds, changes and deletes.

TABLE 1

Showing a Typical Relational Database Table

| Record Number | Field 1 | Field 2 | Field 3 | Field 4 |
| --- | --- | --- | --- | --- |
| 001 | Data 1, 1 | Data 1, 2 | Data 1, 3 | Data 1, 4 |
| 002 | Data 2, 1 | Data 2, 2 | Data 2, 3 | Data 2, 4 |
| 003 | Data 3, 1 | Data 3, 2 | Data 3, 3 | Data 3, 4 |
| 004 | Data 4, 1 | Data 4, 2 | Data 4, 3 | Data 4, 4 |
| 005 | Data 5, 1 | Data 5, 2 | Data 5, 3 | Data 5, 4 |
| 006 | Data 6, 1 | Data 6, 2 | Data 6, 3 | Data 6, 4 |
| 007 | Data 7, 1 | Data 7, 2 | Data 7, 3 | Data 7, 4 |

Table 1. represents a table in a typical relational database. A database is an organized collection of information. The information may consist of numbers such as a persons age or strings which may be a collection of numbers and letters that carry information that cannot be put into a mathematical formula. An example of this is a persons address which contains a street number, but, of course, it would not make any sense to add, subtract or multiply such a number with any other number.

In database terminology a file is called a table, each record in the file is called a row, and each field is called a column.

The table above shows a column called a record number. Each row has a unique record number. In the table above, since it is a relational database, there is usually another table that contains more information about a particular field than is shown in the primary table. To be able to find the information in the second table that corresponds to the information in the first table there has to be a correspondence between the information in the first table and the information in the second table. The information in the first table that establishes that correspondence is called the primary key. That key must also be found in the second table, that key in the second table is called the foreign key.

What the present invention does is allow the user to select a database that is going to be monitored for changes. These changes may be a row that has been added or deleted or a field in a particular row has been added, deleted or changed. The user not only can select the database table to be monitored but the user can also select the particular columns that the user wants to be monitored.

In Table 1. assume that Field 1 is our primary field. The database is sorted (organized from top to bottom) alphabetically. Field 2 is assumed to be the field that we want to monitor for changes. When the data monitor first retrieves a snapshot of this database table it hashes the values of Field 2 in each row in the table in turn. If in Record 2 the data changes value in Field 2 then the hash value in the snapshot database will not match the current hash value of Field 2 Record 2. The actual data value of Field 2 Record 2 is then extracted from the database. If a record is deleted from the database table or added to the database table then we also have a mismatch in the hash values.

The data that has changed can then be evaluated using the tools provided by this invention. Depending on what the user decides is the criteria the invention then acts as an agent and takes another predetermined action.

When more than one field of a particular record is monitored the data agent monitor first determines that a change has occurred by comparing the hash values. The monitor then determines which field changed. The changed data then has business rules applied to said data and the data is subsequently packaged and transmitted to the appropriate predetermined agent.

FIG. 1 shows a typical network of devices that may be a local area network (LAN) 15 to which the querying site is connected or remote to the site and connected to the site via a wide area network (WAN). The Data Agent Server 18 is composed of two primary structural elements. They are the engine and the software agents. The engine is in turn composed of the shell, the database monitor agent and the data log agent. These three are tightly integrated to schedule, launch and record Data Agent Server processes. The engine enables the user to coordinate the activities of the software agents and to generate an automatic logfile of all scheduled activity. The snapshot database 12 is the memory location where the values representing the state of the database being monitored are kept. The values are kept in a condensed form known in the art as the hash value of the data being monitored. The Data Agent Server 18 can monitor databases and file servers and also update databases and file servers. The SQL file server 11 may contain the database to be monitored and the Oracle server may contain the database that is updated with changes that occur in the SQL server 11. It is also possible that a change in the SQL server 11 will require a change in the file server 10.

The software agents that are resident in the Data Agent Server may also be used to communicate to a fax machine 14 to send a fax concerning the date that changed, use a printer 20 to print out a report, or generate E-mail, or to send the changed information to a remote location via a World Wide Web (WWW) server 16.

Figure 2:
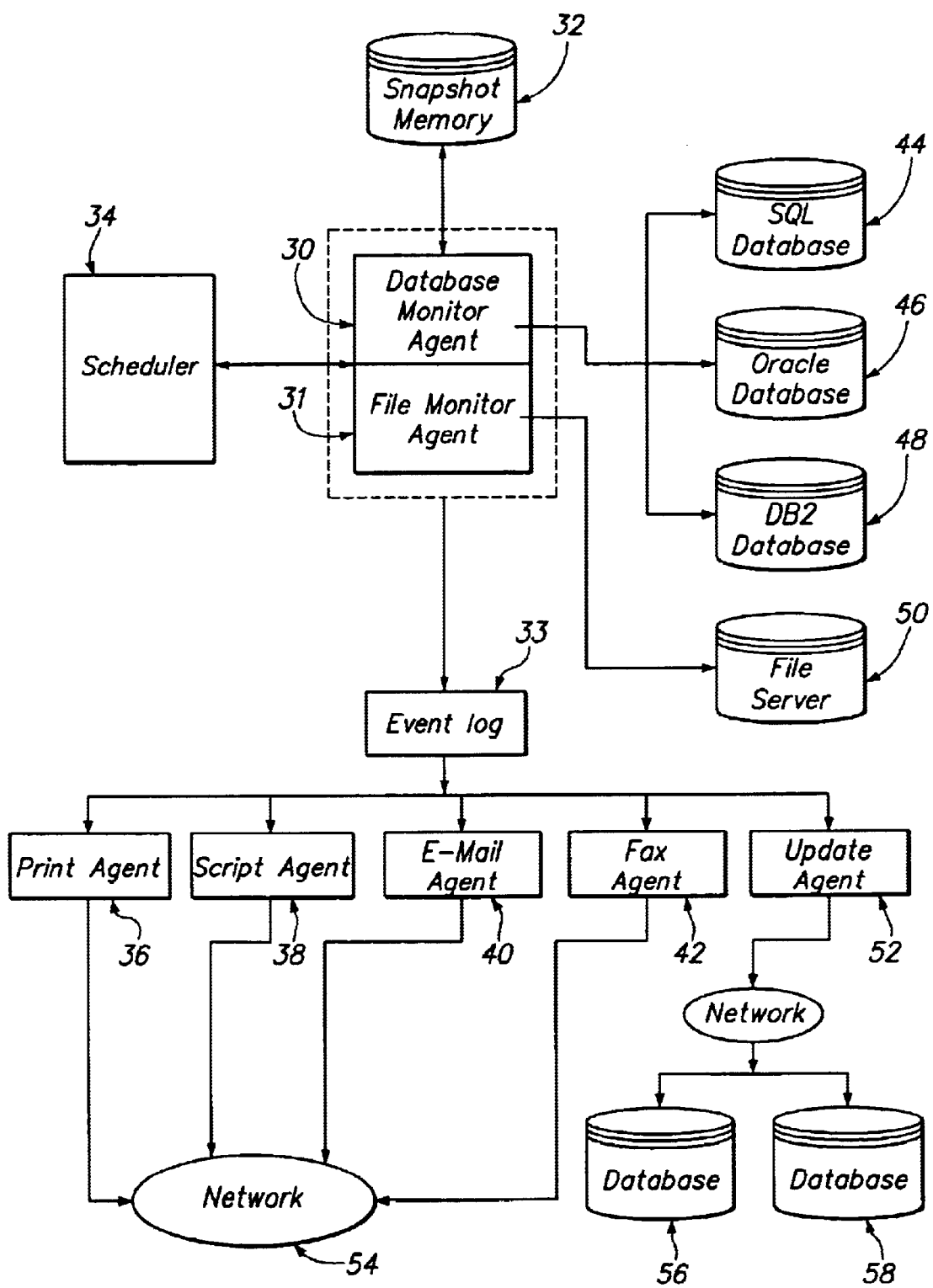
FIG. 2 is a pictorial representation of the elements that make up the present invention and their relationship to various other devices.

FIG. 2 shows another representation of the preferred embodiment. The database monitor agent 30 and the file monitor agent communicate with the databases to be monitored 44, 46, 48, and the file servers to be monitored 50. The time intervals that the user selects to monitor the database and file servers are stored in memory in the scheduler 34. At this predetermined interval the database monitor agent 30 or as the case may be, the file monitor agent 31, query the predetermined data to be monitored and compare that data with the data values stored in memory in the snapshot memory location 32. If a change is determined to have occurred the new data is then examined according to a set of predetermined business rules residing in the respective agents. The data that has changed is then packaged into a data object, recorded in the event log 33 and handed off to the appropriate predetermined agent. That agent may be the print agent 36, the script agent 38, the E-mail agent 40, the fax agent 42 or the update agent 52. This is not an exhaustive list of agents but is a representative sample of the agents that may be engaged by the data or file monitor agents to be activated in the case of the change. It is also possible that agents may be activated when the data and file monitor agents detect no change in the databases or files. This may often be as significant as a change would be.

Figure 3:
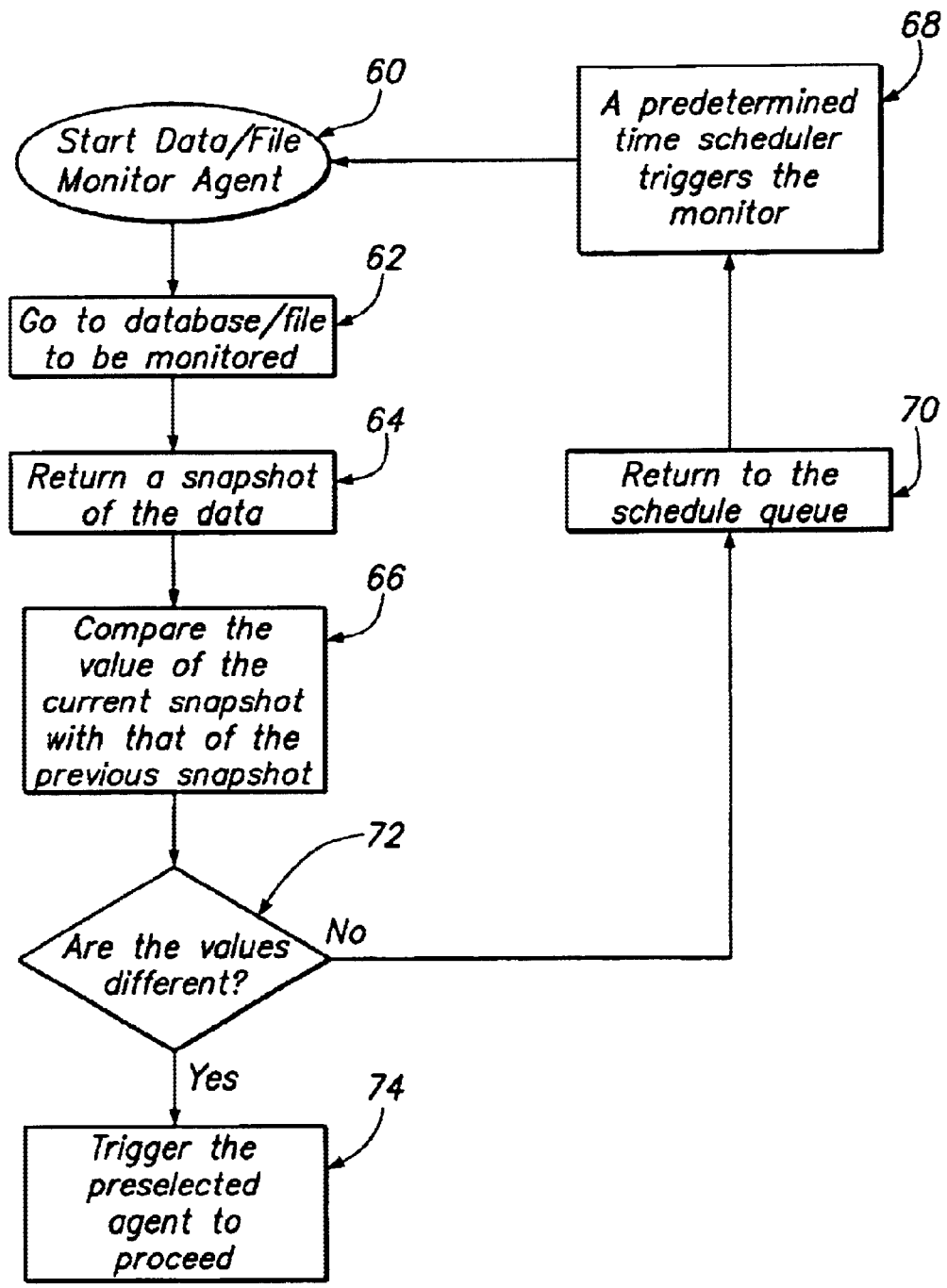
FIG. 3 is a block diagram representing the steps taken to monitor a database.

FIG. 3 describes how the data is monitored, compared to previous data, and how the results of the comparison are handled. When the data/file monitor agent 60 is triggered by the time scheduler 68 then the agent communicates with the database/file that the user has predetermined 62. The data/file monitor then returns a snapshot of the current data 64 while dwelling on the designated row. The new snapshot is then compared to the previous snapshot 66 to determine if any data has been added, deleted, or changed. If there is a difference 72 then the predetermined update agent is engaged 74. If there is no change then the monitor request returns to the schedule queue 70. When the user is interested in using the update agent to take an action when there is no change in the data then the user can select that the agents engage when this occurs.

Figure 4:
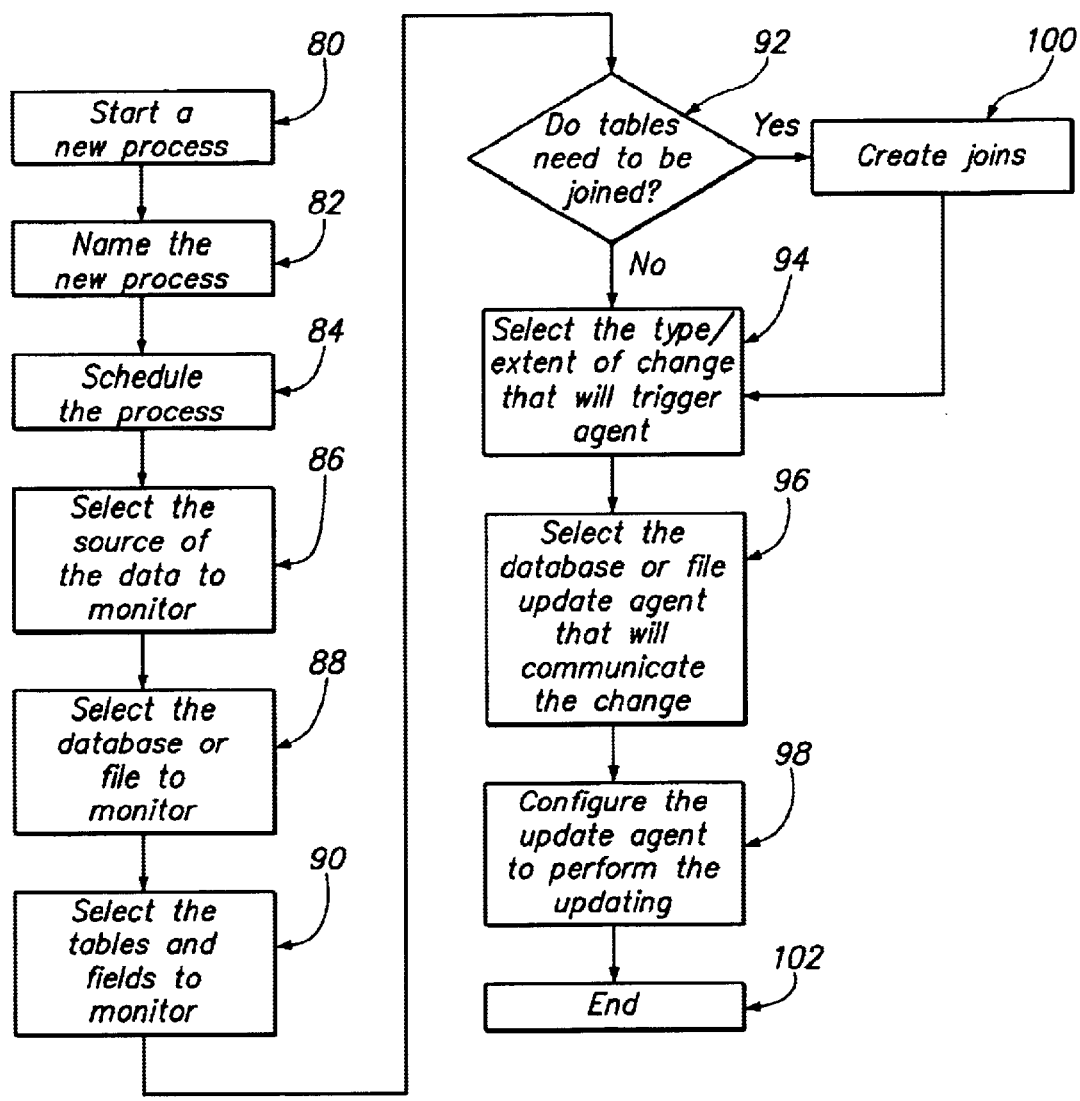
FIG. 4 is a block diagram representing the steps taken to initialize the system to monitor and update databases and files.

FIG. 4 shows the steps a user takes to initialize the system for use in monitoring, updating or informing when a database or file has been added to, deleted from, changed or left the same. The process is started 80 when the user starts the executable run file that applies the invented application software to the users operating system. The user then names the process that is to be generated 82. Next the process that the user wants to run is scheduled 84, the schedule can vary anywhere from every minute, every hour, every week, every month or anything in between. Then the source of the data or file that is to be monitored must be selected 86, followed by selecting the particular database and file 88. If selecting a database then it is necessary to pick the particular database table and fields that are to be monitored. If there are tables to be joined 92, a term of database art well known by practitioners, the user selects the joins that are required 100. Also the criteria that will trigger an update must be selected 94. The user then selects the particular agents that the user desires to be updated or informed of the change 96 and configures that update agent to perform the updating 98. This concludes the initialization 102.

When the preferred embodiment of the invention needs to communicate to the change agents what the data that changed is, then the preferred embodiment packages the changed data into an object prior to handing the changed data off to the change agent. The following pseudocode that packages the information that is handed off to the update agents will be easily recognized by those familiar with the programming art.

Terms: Data item—One distinct piece of information, for example a name, address or number are all Data Items in this context.

Recordset—The set of data to be stored. Usually the result of a query against a database.

Collection—A pre-defined, zero based array which is inherent in the object definition.

Adding Data:

Query source database or read formatted data file to obtain the desired data block or recordset.

Create a new instance of the PackageItem object.

Assign (Set) the PackageItem's Value, ItemType, ItemDefinedSize and ItemTypeName properties for the first data item with the Package Object's WriteItem Method. WriteItem("Name",Y, 100, pkgString)

Use the Package Object's Add method to append the Packageitem to the PackageItem collection of the Package Object (Assuming that an instance of the Package Object has been created. If not, then create it).

---

MyDataObj.Add "Name"    'MyDataObj is the name of Package Object

---

Repeat the last three steps above until the entire recordset or data block has been assigned to PackageItems and those PackageItems have been added to the Package object.

```
Dim I as integer
For I=0 To X
    WriteItem("I",Y,pkgString)
Next I
```

Retrieving Data:

Use the Package object's Data or Read Property to obtain the data item(s) from the package object. This function returns all the data in the object as a string.

```
Astring = MyDataObj.Read 'AString is a string variable to hold the data
```

To retrieve one data item at a time, use the Package object's Item property
Astring=MyDataObj.Item(Index)

To verify the existence of a data item (PackageItem) in the object, use the ItemExists property of the Package Object.
If MyDataObj.ItemExists(Index) Then
End If Object Management:

To clear (empty) a Package Object instance, use the clear method.
MyDataObj.Clear Or destroy the instance of the object.
MyDataObj=Nothing To obtain the number of PackageItems contained in the Package Object, use the Count property of the Package Object.
Aint=MyDataObj.Count To obtain the Name of the person who created the current instance of the object, use the Created By property of the Package object.
Astring=MyDataObj.CreatedBy Similarly to obtain the date when the instance was created, use the DateCreated property of the Package object.
Adate=MyDataObj.DateCreated To load data from a file (formatted), use the Load function of the Package object.
MyDataObj.Load Filename To get the name of the Package object instance use the Name property.
Astring=MyDataObj.Name To get or set the owner of the Package object instance, use the owner property.

```
Astring = MyDataObj.Owner      'Gets the Owner
MyDataObj.Owner = Astring      'Sets the Owner
```

To remove a data item (PackageItem) from the Package object, use the Remove method of the package object.
MyDataObj.Remove PackageItem(Index)

To write the Package object contents to a data file, use the Store method of the Package object.
MyDataObj.Store Filename To append any additional data to the Package object, use the Tag property of the Package object.

MyDataObj.Tag="Zevatech"

This package object is handed off to the preselected agent to communicate the change to the preselected entity. While preferred embodiments of the invention have been shown and described, it will be apparent to those skilled in the art that various modifications may be made in these embodiments without departing from the spirit of the present invention. For that reason, the scope of the invention is set forth in the following claims.

What is claimed is:

1. A method of comparing data contents contained in user predefined fields of a user predefined database table of a user predefined database at user predefined intervals, the method allowing for one or more of a plurality of actions to be taken, the method comprising the steps of:

a) sending a query to said user predefined fields, extracting a first instance number representing the data contents of one or more fields associated with a primary field, wherein said one or more fields used in extracting said first instance number are selectable by a user and wherein said first instance number is a hashed value, and placing said first instance number in a "snapshot" data record;

b) at said user predetermined time interval, sending said query to said predefined fields, and extracting a second instance number representing the data contents of said one or more fields associated with said primary field at said user predetermined interval, wherein said second instance number is a hashed value;

c) comparing said first instance number with said second instance number, wherein a mismatch between the first instance number and the second instance number indicates the data contents of said one or more fields associated with said primary field have changed over said predetermined intervals;

d) applying a business rule to determine which of said plurality of actions to take if a mismatch exists between the first instance number and the second instance number; and, e) performing at least one of said plurality of actions if no mismatch exists between the first instance number and the second instance number.

2. The method of claim 1 further including the acts of packaging said changed data into a software object format that is thereby sent to at least one update agent.

3. The method of claim 2 wherein the update agent communicates said changed data to at least one of a plurality of destinations preselected by the user.

4. The method of claim 3 further including the acts of recording into an accessible and retrievable memory location the acts of determining when said data contents changed and the acts of which update agents were activated whenever said data contents changed and whenever said update agents were activated.

5. A computer implemented system for comparing data contents contained in user predefined fields of a user predefined database table of a user predefined database at user predefined intervals, wherein said computer implemented system allows one or more of a plurality of actions to be taken, the computer implemented system comprising:

a) sending a query to said user predefined fields, extracting a first instance number representing the data contents of one or more fields associated with a primary field, wherein said one or more fields used in extracting said first instance number are selectable by a user and wherein the first instance number is a hashed value, and placing said first instance number in a "snapshot" data record;

b) at said user predetermined interval, sending said query to said predefined fields, and extracting a second instance number representing the data contents of said one or more fields associated with said primary field at said user predetermined interval, wherein said second instance number is a hashed value;

c) comparing said first instance number with said second instance number, wherein a mismatch between the first instance number and the second instance number indicates the data contents of said one or more fields associated with said primary field have changed over said predetermined interval;

d) applying a business rule to determine which of said plurality of actions to take if a mismatch exists between the first instance number and the second instance number; and, e) performing at least one of said plurality of actions if no mismatch exists between the first instance number and the second instance number.

6. The system of claim 5 further including packaging said changed data into a software object format that is thereby sent to at least one update agent.

7. The system of claim 6 wherein the update agent communicates said changed data to at least one of a plurality of destinations preselected by the user.

8. The system of claim 7 further including recording into an accessible and retrievable memory location the acts of determining when said data contents changed and the acts of which update agents were activated whenever said data contents changed and whenever said update agents were activated.

9. A computer implemented system for comparing data contents contained in user predefined fields of a user predefined database table of a user predefined database at user predefined intervals, wherein said computer implemented system allows one or more of a plurality of actions to be taken, the computer implemented system comprising:

a) means for sending a query to said user predefined fields, extracting a first instance number representing the data contents of one or more fields associated with a primary field, wherein said one or more fields used in extracting said first instance number are selectable by a user and wherein said first instance number is a hashed value, and placing said first instance number in a "snapshot" data record;

b) at said user predetermined interval, sending said query to said predefined fields, and extracting a second instance number representing the data contents of said one or more fields associated with said primary field at said user predetermined interval, wherein said second instance number is a hashed value;

c) comparing said first instance number with said second instance number, wherein a mismatch between the first instance number and the second instance number indicates the data contents of said one or more fields associated with the primary field have changed over said predetermined interval;

d) applying a business rule to determine which of said plurality of actions to take if a mismatch exists between the first instance number and the second instance number; and, e) performing at least one of said plurality of actions if no mismatch exists between the first instance number and the second instance number.

10. The system of claim 9 further including packaging said changed data into a software object format that is thereby sent to at least one update agent.

11. The system of claim 10 wherein the update agent includes means for communicating said changed data to at least one of a plurality of destinations preselected by the user.

12. The system of claim 11 further including means for recording into an accessible and retrievable memory location the acts of determining when said data contents changed and the acts of which update agents were activated whenever said data contents changed and whenever said update agents were activated.

* * * * *